(12) United States Patent
Jin et al.

(10) Patent No.: US 11,516,574 B2
(45) Date of Patent: Nov. 29, 2022

(54) AUDIO OUTPUT DEVICE AND METHOD TO DETECT WEARING THEREOF

(71) Applicant: Samsung Electronics Co., Ltd., Suwon-si (KR)

(72) Inventors: Seoyoung Jin, Suwon-si (KR); Hongki Kim, Suwon-si (KR); Donghan Lee, Suwon-si (KR); Kiwook Han, Suwon-si (KR); Kyungik Jang, Suwon-si (KR); Sungnam Jeong, Suwon-si (KR); Jeongmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/164,065

(22) Filed: Feb. 1, 2021

(65) Prior Publication Data

US 2021/0250674 A1    Aug. 12, 2021

(30) Foreign Application Priority Data

Feb. 7, 2020    (KR) .................. 10-2020-0014904

(51) Int. Cl.
*H04R 1/10* (2006.01)
*G01P 1/00* (2006.01)
*G01P 15/00* (2006.01)

(52) U.S. Cl.
CPC .............. *H04R 1/1041* (2013.01); *G01P 1/06* (2013.01); *H04R 1/1016* (2013.01);
(Continued)

(58) Field of Classification Search
CPC .. H04R 1/1041; H04R 1/1016; H04R 1/1025; H04R 1/1075
See application file for complete search history.

(56) References Cited

U.S. PATENT DOCUMENTS 10,015,582 B2    7/2018  Wagner et al.
10,104,463 B2    10/2018 Kim et al.
(Continued)

FOREIGN PATENT DOCUMENTS

KR    10-2017-0082022 A    7/2017
KR       10-1848669 B1    5/2018

OTHER PUBLICATIONS

International Search Report dated May 6, 2021, issued in International Application No. PCT/KR2021/001287.

*Primary Examiner* — Simon King
(74) *Attorney, Agent, or Firm* — Jefferson IP Law, LLP

(57) ABSTRACT

An audio output device is provided. The audio output device includes a housing, an audio output unit outputting audio data, a first contact sensor configured to detect a contact of an external object, a second contact sensor configured to detect a contact of the external object, a proximity sensor configured to detect a proximity of the external object within a predetermined distance, and a processor operatively connected to the audio output unit, the first contact sensor, the second contact sensor, and the proximity sensor. The processor may be configured to execute a wearing detection mode of the audio output device, to determine the contact of the external object through the first contact sensor, to determine the contact of the external object through the second contact sensor, to determine the proximity of the external object through the proximity sensor, and to determine that the audio output device is in a state worn by the external object.

20 Claims, 10 Drawing Sheets

(52) U.S. Cl.
CPC ......... *H04R 1/1025* (2013.01); *H04R 1/1075* (2013.01); *G01P 15/00* (2013.01); *H04R 2420/07* (2013.01)

(56) References Cited

U.S. PATENT DOCUMENTS

| | | | |
|---|---|---|---|
| 10,247,749 | B2 | 4/2019 | Lee et al. |
| 10,313,776 | B2 | 6/2019 | Han et al. |
| 10,728,646 | B2 * | 7/2020 | Mohammadi ........ H03K 17/962 |
| 2017/0311097 | A1 * | 10/2017 | Nielsen ................. A61B 5/398 |
| 2018/0014103 | A1 * | 1/2018 | Martin ................. H04R 1/1025 |
| 2018/0103321 | A1 * | 4/2018 | Seo ...................... H04R 1/1091 |
| 2019/0058937 | A1 * | 2/2019 | Saulsbury ............ A61B 5/6817 |
| 2019/0215621 | A1 | 7/2019 | Albahri et al. |
| 2019/0261094 | A1 | 8/2019 | Greenlee |
| 2019/0332141 | A1 * | 10/2019 | Guo ...................... G06F 3/0346 |
| 2020/0037061 | A1 * | 1/2020 | Boulanger ........... H04R 1/1008 |
| 2020/0037076 | A1 * | 1/2020 | Boulanger ........... H04R 29/001 |
| 2020/0280801 | A1 * | 9/2020 | Andersen ............. H04R 1/1083 |
| 2021/0029435 | A1 * | 1/2021 | Siahaan ............... H04R 1/1075 |
| 2021/0034195 | A1 * | 2/2021 | Lee ....................... G06F 3/0443 |

\* cited by examiner

AUDIO OUTPUT DEVICE AND METHOD TO DETECT WEARING THEREOF

CROSS-REFERENCE TO RELATED APPLICATION(S)

This application is based on and claims priority under 35 U.S.C. § 119(a) of a Korean patent application number 10-2020-0014904, filed on Feb. 7, 2020, in the Korean Intellectual Property Office, the disclosure of which is incorporated by reference herein in its entirety.

BACKGROUND

1. Field

The disclosure relates to an audio output device capable of outputting audio data received from an external electronic device through wireless communication and to a method of detecting whether the audio output device is worn by a user.

2. Description of Related Art

With the growth of mobile communication and hardware/software technologies, portable electronic devices (hereinafter referred to as electronic devices), such as a smart phone come to have various functions and have ability to offer video/audio contents to users through various applications.

The electronic device may offer audio data generated by a certain application to a user through an audio accessory connected wiredly or wirelessly. Recently, the audio accessory is changing from using wired connection to using wireless connection, and various kinds of audio output devices, such as an earphone, a headphone, an earbud, and speakers that are connected to the electronic device via short-range wireless communication, such as Bluetooth are used. Among them, the earbud refers to a device capable of being worn on a user's ear and outputting audio data received via wireless communication.

When worn on the user's ear, the earbud type audio output device may perform various functions, such as wireless communication connection with an external electronic device and output of audio data. To this end, it may be required to recognize in real time whether the audio output device is worn on the user's ear.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a technique to determine, by using a plurality of various type sensors, whether an audio output device is worn on a user's body, such as ear.

Another aspect of the disclosure is to provide a technique to reduce or optimize power consumption when an audio output device detects a worn state thereof.

Additional aspects will be set forth in part in the description which follows and, in part, will be apparent from the description, or may be learned by practice of the presented embodiments.

In accordance with an aspect of the disclosure, an audio output device is provided. The audio output device includes a housing, an audio output unit disposed on a first surface of the housing and outputting audio data, a first contact sensor disposed on the first surface of the housing and configured to detect a contact of an external object, a second contact sensor disposed to be spaced apart from the first contact sensor on the first surface of the housing and configured to detect a contact of the external object, a proximity sensor disposed on the first surface of the housing and configured to detect a proximity of the external object within a predetermined distance, and a processor operatively connected to the audio output unit, the first contact sensor, the second contact sensor, and the proximity sensor. The processor may be configured to execute a wearing detection mode of the audio output device, to determine the contact of the external object through the first contact sensor, to determine the contact of the external object through the second contact sensor, to determine the proximity of the external object through the proximity sensor, and to determine that the audio output device is in a state worn by the external object, based on determining the contact and proximity of the external object.

In accordance with another aspect of the disclosure, a method of detecting wearing of an audio output device is provided. The method includes executing a wearing detection mode of the audio output device, determining a contact of an external object through a first contact sensor, determining a contact of the external object through a second contact sensor, determining a proximity of the external object through a proximity sensor, and determining that the audio output device is in a state worn by the external object, based on determining the contact and proximity of the external object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
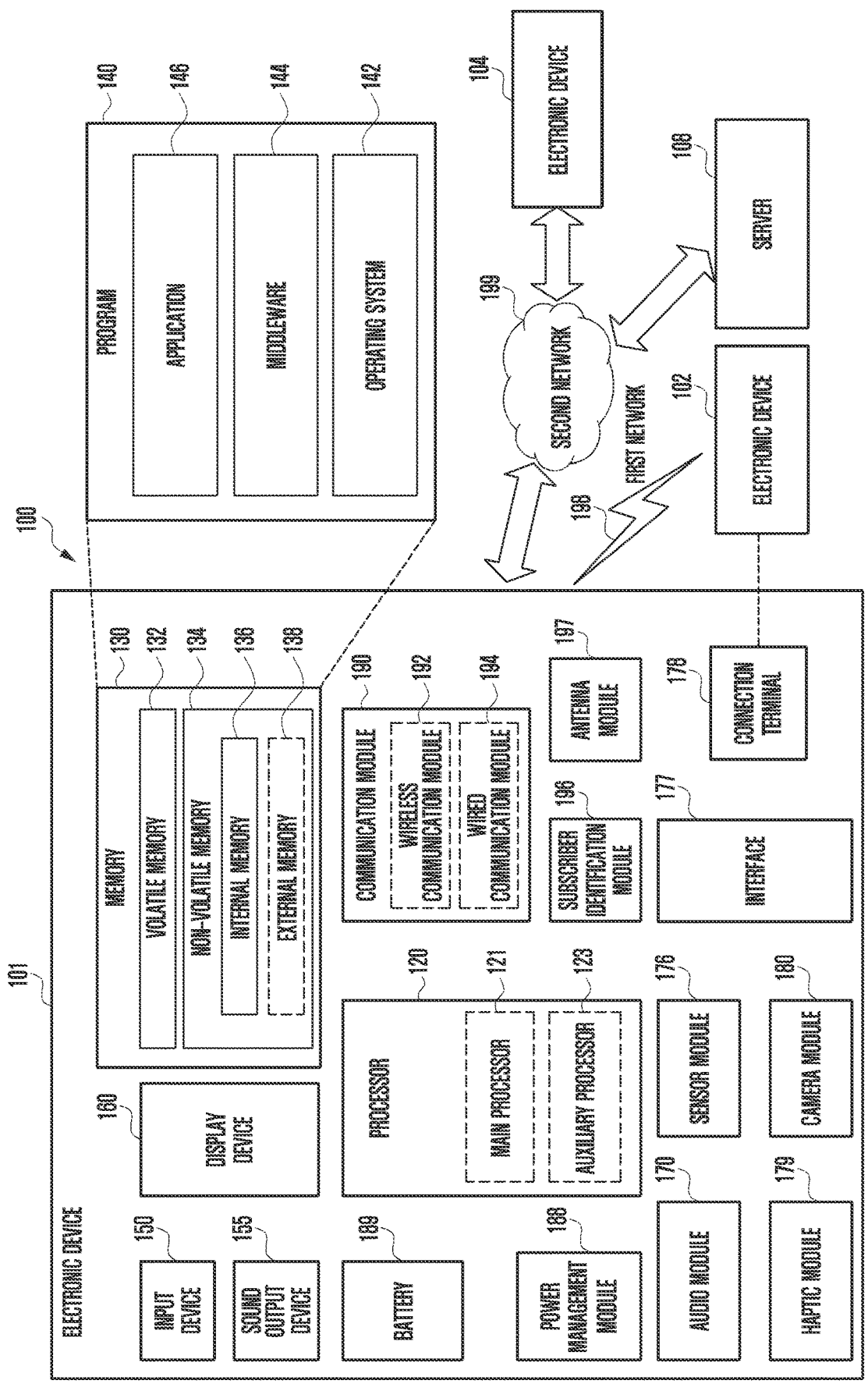
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
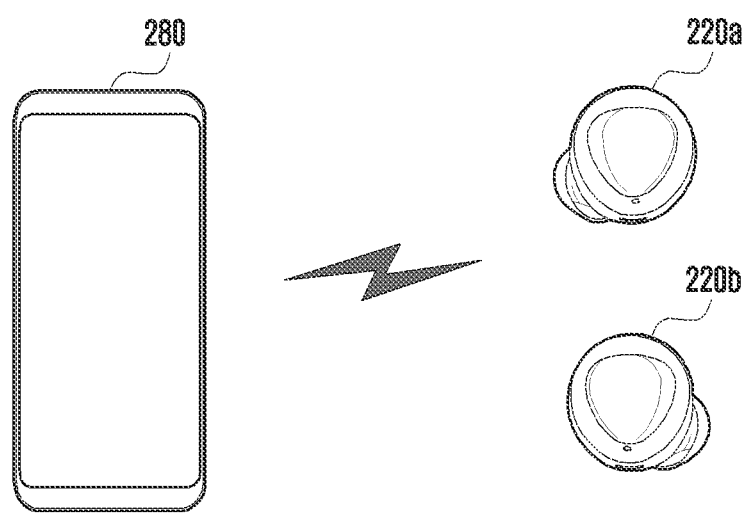
FIG. 2 illustrates an electronic device and an audio output device according to an embodiment of the disclosure.

FIG. 2 illustrates an electronic device and an audio output device according to an embodiment of the disclosure.

Referring to FIG. 2, according to various embodiments of the disclosure, the audio output device 220a, 220b (e.g., the electronic device 102 in FIG. 1) may receive digital audio data from the electronic device 280 (e.g., the electronic device 101 in FIG. 1) through short-range wireless communication (e.g., Bluetooth, WIFI direct) and output audio sound by processing the received digital audio data.

According to various embodiments of the disclosure, the audio output device 220a, 220b may be implemented in various forms of a wireless audio accessory, such as, but not limited to, a speaker, an earphone, a headphone, and an earbud. In various embodiments of the disclosure, a case where the audio output device 220a, 220b is configured in the earbud type, that is, a type that can be worn on both left and right ears and can output audio data received through short-range wireless communication, will be described as an example.

Referring to FIG. 2, the audio output devices 220a and 220b may include a first audio output device 220a and a second audio output device 220b, which are physically and electrically separated from each other. The first audio output device 220a and the second audio output device 220b may be mounted on user's left and right ears, respectively. According to various embodiments of the disclosure, the first audio output device 220a may operate as a master, and the second audio output device 220b may operate as a slave (or vice versa). For example, the first audio output device 220a operating as a master based on sniffing technique may output audio data received from the electronic device 280 through short-range wireless communication, and the second audio output device 220b operating as a slave may output audio data received from the first audio output device 220a. In this case, the first audio output device 220a may transmit sync information together with audio data to the second audio output device 220b in order to synchronize the audio output timing with the second audio output device 220b.

According to various embodiments of the disclosure, the electronic device 280 may generate audio data through various applications and transmit the generated audio data to the first audio output device 220a and/or the second audio output device 220b through short-range wireless communication. In one example, the first audio output device 220a may receive audio data from the electronic device 280 connected through short-range wireless communication, and the second audio output device 220b may receive audio data from the electronic device 280 or the first audio output device 220a. Each of the first audio output device 220a and the second audio output device 220b may temporarily store the received audio data in a buffer memory (e.g., the memory 440 in FIG. 4) and output the stored audio data in a first-in first-out manner.

According to various embodiments of the disclosure, the earbud-type audio output device shown in FIG. 2 may performs various operations (e.g., outputting audio data, wireless connection with the electronic device 280), based on whether or not it is worn on the user's ear. According to various embodiments of the disclosure, each of the first audio output device 220a and the second audio output device 220b may include various sensors (e.g., an acceleration sensor, a proximity sensor, and/or a contact sensor) and a processor for determining wearing or not, based on sensing values of the sensors. Hereinafter, the structure and operation will be described based on any one of the first audio output device 220a and the second audio output device 220b, and the following description about the structure and operation may be applied equally to both the first audio output device 220a and the second audio output device 220b.

Figure 3A:
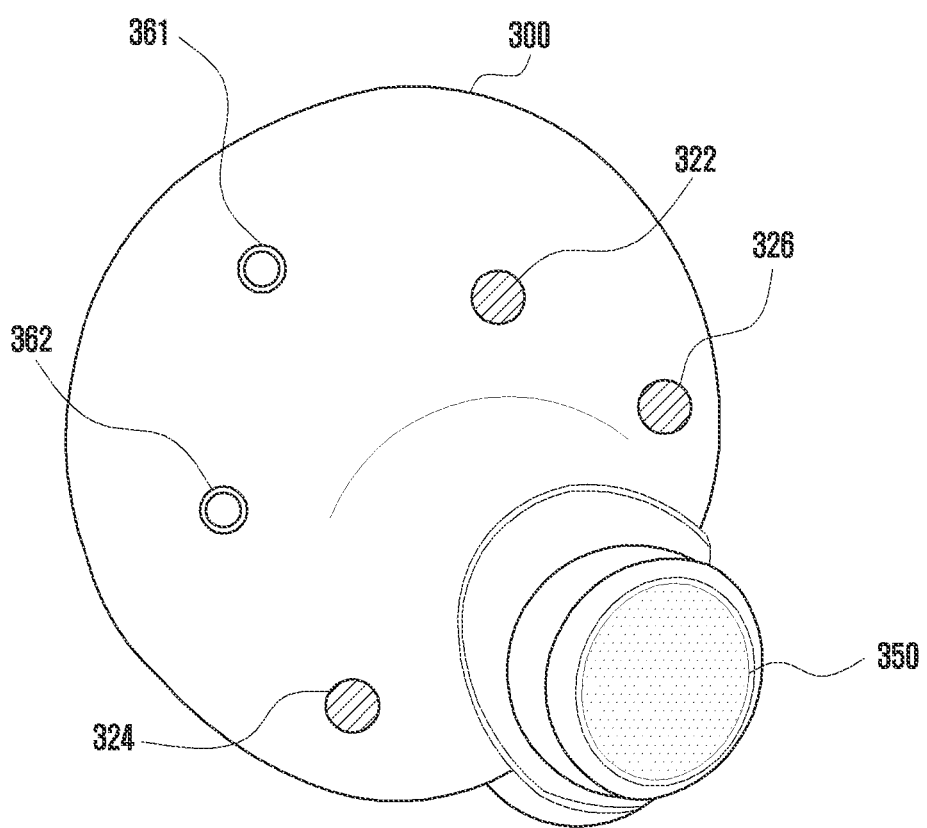
FIGS. 3A and 3B illustrate an outward appearance of an audio output device according to various embodiments of the disclosure.
Figure 3B:
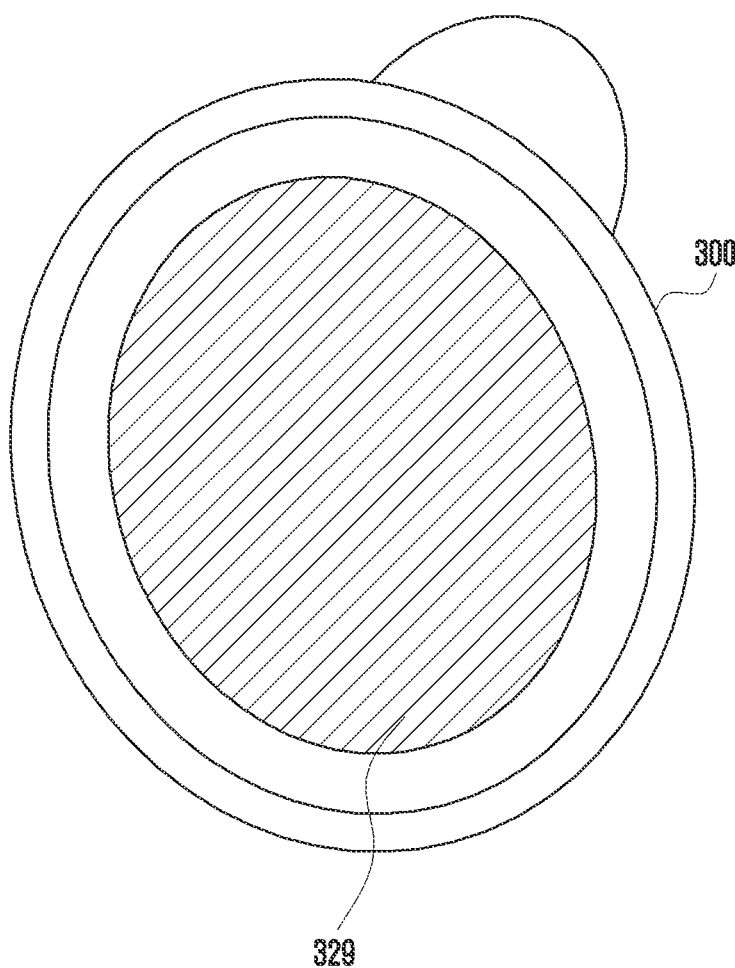

FIGS. 3A and 3B illustrate an outward appearance of an audio output device according to various embodiments of the disclosure.

FIGS. 3A and 3B illustrate the front and rear surfaces of any one of two audio output devices (e.g., the first audio output device 220a and the second audio output device 220b in FIG. 2), respectively. The two audio output devices may have a shape symmetrical to each other so as to be mounted on user's left and right ears, respectively.

Hereinafter, a housing surface being in contact with the ear when the user wears the audio output device will be referred to as a front surface, and a housing surface exposed to the outside will be referred to as a rear surface. The front and rear surfaces may be not separated by a boundary line and may be smoothly connected to each other by a curved surface.

FIG. 3A shows the front surface of the audio output device.

Referring to FIG. 3A, the audio output device 300 (e.g., the first audio output device 220a or the second audio output device 220b in FIG. 2) may include an audio output unit 350 disposed on the front surface to output audio data. The audio output unit 350 may have a protruding shape so as to be inserted into an external auditory canal.

According to various embodiments of the disclosure, the audio output device 300 may include a plurality of sensors for detecting wearing. At least a part of each sensor may be visually exposed to the outside through a removed portion (or opening) of a housing of the audio output device 300.

According to various embodiments of the disclosure, the audio output device 300 may include a proximity sensor 322 that detects the proximity of an external object (e.g., a user's ear) within a predetermined distance.

According to various embodiments of the disclosure, the proximity sensor 322 is an optical proximity sensor, and includes a light emitter that outputs a certain amount of light (e.g., infrared light), and a light receiver that detects light reflected from an external object after being outputted by the light emitter. Thus, based on the amount of the reflected light detected by the light receiver, the proximity sensor 322 may detect whether the external object proximity within a predetermined distance. For example, when an external object is close, the amount of reflected light is large. Therefore, based on the amount of reflected light, the proximity sensor 322 may detect how close the external object is.

According to various embodiments of the disclosure, the proximity sensor 322 is not limited to the above-mentioned optical proximity sensor and may alternatively use any other type, such as a magnetic proximity sensor, an ultrasonic proximity sensor, and an inductive proximity sensor.

Although only one proximity sensor 322 is shown in FIG. 3A, the audio output device 300 may include two or more proximity sensors disposed to be spaced apart from each other in some embodiments. According to another embodiment of the disclosure, by including two or more interfaces, the proximity sensor 322 may detect the proximity of an external object at a plurality of positions. According to various embodiments of the disclosure, the audio output device 300 may include one or more contact sensors that detect contact of an external object. According to various embodiments of the disclosure, the audio output device 300 may include a first contact sensor 324 and a second contact sensor 326, which are disposed to be spaced apart from each other. Referring to FIG. 3A, the first contact sensor 324 and the second contact sensor 326 may be disposed in opposite directions with respect to the audio output unit 350.

According to various embodiments of the disclosure, when an external object is a part of a body, the first contact sensor 324 and the second contact sensor 326 may detect contact of the external object. For example, the first contact sensor 324 and the second contact sensor 326 may be implemented as a capacitive type sensor, which may not output a signal corresponding to contact detection when an external object that is not a part of a body comes into contact.

According to an embodiment of the disclosure, the first contact sensor 324 and the second contact sensor 326 may be separate sensors. According to another embodiment of the disclosure, one contact sensor may include both the first contact sensor 324 and the second contact sensor 326.

According to still another embodiment of the disclosure, a touch sensor may include the first contact sensor 324 and the second contact sensor 326.

Figure 4:
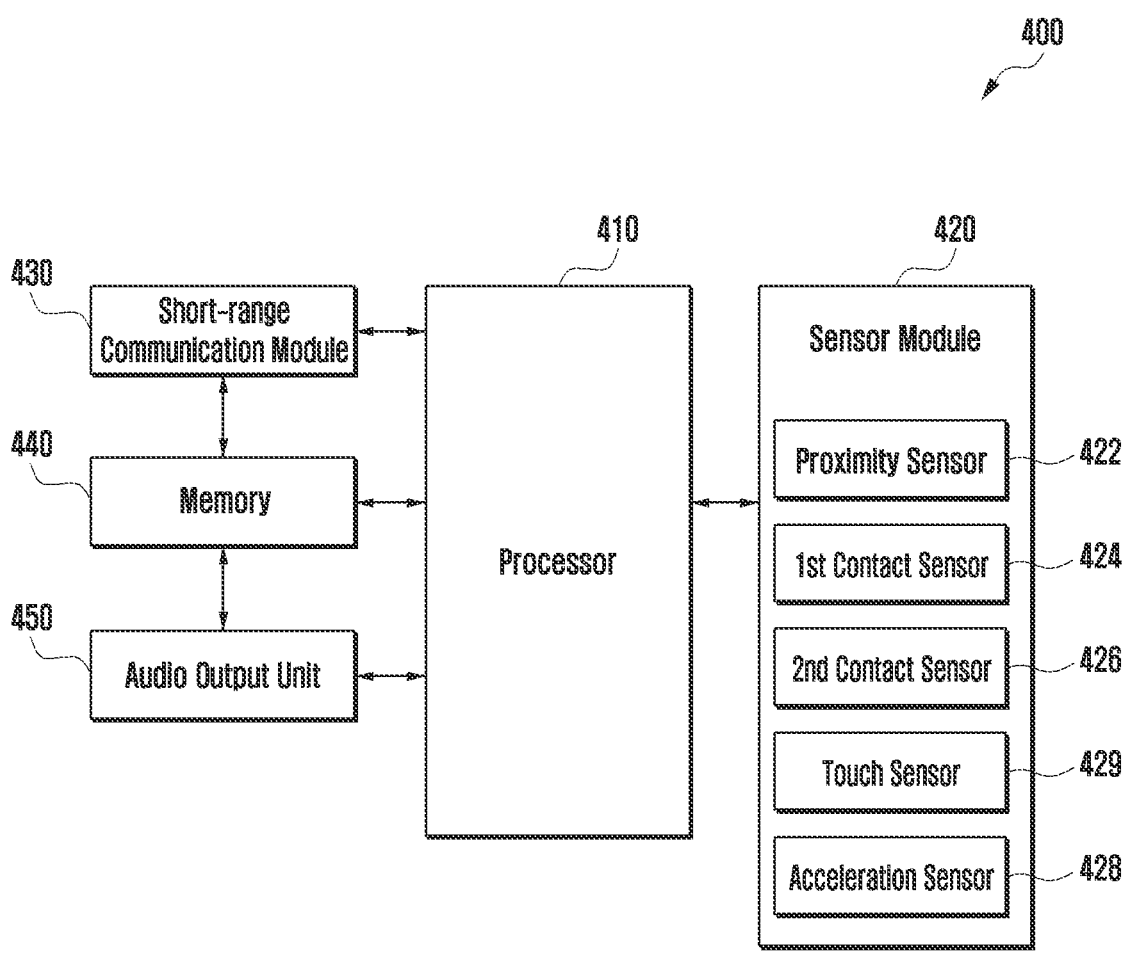
FIG. 4 is a block diagram illustrating an audio output device according to an embodiment of the disclosure.

In an embodiment where the first contact sensor 324 and the second contact sensor 326 are configured as separate sensors, each of the first and second contact sensors 324 and 326 may independently have an integrated circuit (IC) and a touch interface (e.g., a touch panel) and may independently transmit a signal corresponding to touch detection to a processor (e.g., the processor 410 in FIG. 4).

In another embodiment where one contact sensor includes both the first contact sensor 324 and the second contact sensor 326, the contact sensor may have a single touch IC, and the first contact sensor 324 and the second contact sensor 326 may be respectively formed of a first touch interface and a second touch interface, which are disposed at different positions. According to this embodiment of the disclosure, among touch interfaces connected to the touch IC, the first touch interface may be disposed at a first position, and the second touch interface may be disposed at a second position. In addition, the touch IC may detect contact at the first position or the second position, based on an electrical signal (e.g., a change in capacitance) generated from the first touch interface or the second touch interface. Each of the first and second touch interfaces may form or be connected to each channel, and each channel may have an analog to digital converter (ADC) and transmit a signal corresponding to touch detection to the touch IC and the processor.

In still another embodiment of the disclosure, the first contact sensor 324, the second contact sensor 326, and the touch sensor may be implemented as one sensor. In this case, the sensor may have a single touch IC, and the first contact sensor 324, the second contact sensor 326, and the touch sensor may be respectively formed of a first touch interface, a second touch interface, and a third touch interface, which are disposed at different positions. The first and second touch interfaces disposed on the front surface of the audio output device 300 to detect contact may have different resistance and sensitivity from those of the third touch interface that covers a wide area of the rear surface to detect a finger touch input.

In some embodiments of the disclosure, the first contact sensor 324, the second contact sensor 326, and the touch sensor 329 are not independent sensors, but may be independent interfaces of one sensor.

According to various embodiments of the disclosure, when the user wears the audio output device 300, the first contact sensor 324 and/or the second contact sensor 326 come into contact with the user's ear, and a part of the touch sensor IC may detect such contact at corresponding position(s) and transmit a detection signal to the processor.

Although FIG. 3A illustrates that the audio output device 300 includes two contact sensors 324 and 326, the audio output device 300 may include three or more contact sensors spaced apart from each other in some embodiments.

According to various embodiments of the disclosure, the audio output device 300 may include one or more charging pins 361 and 362 exposed through the front surface. When the audio output device 300 is mounted on a charging cradle (not shown), the charging pins 361 and 362 may be electrically connected to charging pins of the charging cradle. Therefore, a battery (not shown) of the audio output device 300 may be charged from the charging cradle.

FIG. 3B shows the rear surface of the audio output device.

Referring to FIG. 3B, the touch sensor 329 (or the third touch interface of the touch sensor) may be disposed on the rear surface of the audio output device 300. The touch sensor 329 may be activated to detect a touch input when the audio output device 300 is worn on the user's ear. The audio output device 300 may perform various control operations (e.g., play, pause, track change) related to audio output, based on the duration of a touch input, the number of touch inputs, the strength of a touch input, and the like when such touch inputs are detected by the touch sensor 329.

According to various embodiments of the disclosure, the first contact sensor 324 and the second contact sensor 326 may be implemented as a part of the touch interface of the touch sensor 329. In this case, when a contact with a part of a body occurs at the first contact sensor 324 and/or the second contact sensor 326, the touch sensor 329 may detect such contact and transmit it to the processor.

According to various embodiments of the disclosure, based on the sensing results of the first contact sensor 324, the second contact sensor 326, and the proximity sensor 322, the audio output device 300 may determine whether the audio output device 300 is worn on the user's ear. Hereinafter, various embodiments of detecting wearing of the audio output device 300 will be described.

FIG. 4 is a block diagram illustrating an audio output device according to an embodiment of the disclosure.

Referring to FIG. 4, the audio output device 400 may include a processor 410, a sensor module 420, a short-range communication module 430, a memory 440, and an audio output unit 450. The sensor module 420 may include a proximity sensor 422, a first contact sensor 424, a second contact sensor 426, a touch sensor 429, and an acceleration sensor 428. Even if some of such components shown in FIG. 4 are omitted or substituted, various embodiments may be implemented. The audio output device 400 may be implemented as the audio output device 200a or 200b shown in FIG. 2 or the audio output device 300 shown in FIGS. 3A and 3B.

According to various embodiments of the disclosure, the audio output device 400 may be any one of the first audio output device 200a and the second audio output device 200b shown in FIG. 2. Actually, only one audio output device may be used, two audio output devices may be mounted on both ears and used, or three or more audio output devices may be used when several persons listen to audio, such as in a conference.

According to various embodiments of the disclosure, the short-range communication module 430 may include various components, such as an antenna, a radio frequency (RF) front end, or a communication processor, for performing short-range wireless communication. The short-range wireless communication supported by the short-range communication module 430 may be, for example, but not limited to, Bluetooth. Alternatively, any standard or non-standard communication scheme may be used.

According to various embodiments of the disclosure, using short-range wireless communication, the short-range communication module 430 may receive audio data from an electronic device (e.g., the electronic device 280 in FIG. 2) and transmit information about an operating state (e.g., a battery status) of the audio output device 400 to the electronic device.

According to various embodiments of the disclosure, the audio output unit 450 may output audio data buffered in the memory 440 under the control of the processor 410. As shown in FIGS. 3A and 3B, the audio output unit 450 may be provided to protrude from the front surface of the audio output device 400.

According to various embodiments of the disclosure, the memory 440 may buffer audio data received from the electronic device through the short-range communication module 430. When the electronic device transmits generated audio data to the audio output device 400 in real time, the audio output device 400 may sequentially and temporarily store the received audio data in the memory 440 and then output it through the audio output unit 450. The audio output device 400 may output audio data in a first-in first-out manner, and the outputted audio data may be deleted from the memory 440.

According to various embodiments of the disclosure, the audio output device 400 may include various sensors used for detecting whether it is worn on the user's ear. Some sensors (e.g., the touch sensor 429, the first contact sensor 424, and the second contact sensor 426) included in the sensor module 420 may be electrically and/or functionally connected to each other. The audio output device 400 may further include at least some of the configuration and/or functions of the sensor module 176 shown in FIG. 1.

According to various embodiments of the disclosure, the touch sensor 429 (or a part of a touch interface of the touch sensor 429) may be disposed on the rear surface of the audio output device 400 and may receive a user's touch input. According to various embodiments of the disclosure, the touch interface of the touch sensor 429 may be configured in close contact with an inner surface of the housing, and a touch IC may be disposed on an internal PCB.

According to an embodiment of the disclosure, the first contact sensor 424 and the second contact sensor 426 may be separate sensors. According to another embodiment of the disclosure, one contact sensor may include both the first contact sensor 424 and the second contact sensor 426. According to still another embodiment of the disclosure, the touch sensor 429 may include the first contact sensor 424 and the second contact sensor 426.

In an embodiment where the first contact sensor 424 and the second contact sensor 426 are configured as separate sensors, each of the first and second contact sensors 424 and 426 may independently have an integrated circuit (IC) and a touch interface and may independently transmit a signal corresponding to touch detection to the processor 410.

In another embodiment where one contact sensor includes both the first contact sensor 424 and the second contact sensor 426, the contact sensor may have a single touch IC, and the first contact sensor 424 and the second contact sensor 426 may be respectively formed of a first touch interface and a second touch interface, which are disposed at different positions. According to this embodiment of the disclosure, among touch interfaces connected to the touch IC, the first touch interface may be disposed at a first position, and the second touch interface may be disposed at a second position. In addition, the touch IC may detect contact at the first position or the second position, based on an electrical signal (e.g., a change in capacitance) generated from the first touch interface or the second touch interface. Each of the first and second touch interfaces may form or be connected to each channel, and each channel may have an analog to digital converter (ADC) and transmit a signal corresponding to touch detection to the touch IC and the processor 410.

In still another embodiment of the disclosure, the first contact sensor 424, the second contact sensor 426, and the touch sensor 429 may be implemented as one sensor. In this case, the sensor may have a single touch IC, and the first contact sensor 424, the second contact sensor 426, and the touch sensor 429 may be respectively formed of a first touch interface, a second touch interface, and a third touch interface, which are disposed at different positions. The first and second touch interfaces disposed on the front surface of the audio output device 400 to detect contact may have different resistance and sensitivity from those of the third touch interface that covers a wide area of the rear surface to detect a finger touch input.

According to various embodiments of the disclosure, the proximity sensor 422 may detect the proximity of an external object (e.g., a user's ear) within a predetermined distance. The proximity sensor 422 may be implemented as an optical proximity sensor but is not limited thereto. For example, the proximity sensor 422 may alternatively use any other type, such as a magnetic proximity sensor, an ultrasonic proximity sensor, an inductive proximity sensor, or the like.

According to various embodiments of the disclosure, in case of being implemented as an optical proximity sensor, the proximity sensor 422 may include a light emitter (not shown) and a light receiver (not shown). The light emitter may output a certain amount of light (e.g., infrared (IR) light), and may include an IR light emitting diode (LED). The light receiver may detect light reflected from an external object after being outputted by the light emitter, and may include a photodiode and/or an image sensor. Thus, based on the amount of the reflected light detected by the light receiver, the proximity sensor 422 may detect whether the external object proximity within a predetermined distance. For example, when an external object is close, the amount of reflected light is large. Therefore, based on the amount of reflected light, the proximity sensor 422 may detect how close the external object is. As such, because of depending on the amount of light, the proximity sensor 422 may detect the proximity of an object even if the object is not a part (e.g., ear) of a body.

According to various embodiments of the disclosure, the audio output device 400 may include the first contact sensor 424 and the second contact sensor 426. As earlier described with reference to FIGS. 3A and 3B, the first contact sensor 424 and the second contact sensor 426 may be disposed on the front surface of the audio output device 400 and spaced apart from each other.

According to various embodiments of the disclosure, when an external object is a part of a body, the first contact sensor 424 and the second contact sensor 426 may detect contact of the external object. For example, the first contact sensor 424 and the second contact sensor 426 may be implemented as a capacitive type sensor, which may not output a signal corresponding to contact detection when an external object that is not a part of a body comes into contact.

According to various embodiments of the disclosure, because the audio output device 400 includes two or more contact sensors (or two or more touch interfaces that detect two or more positions), it is possible to reduce misrecognition during charging. For example, if the audio output device 400 includes only one contact sensor, misrecognition may occur when charging is performed by inserting it into a charging cradle. This is because the audio output device 400 has a small size in which a charging pin is adjacent to the contact sensor, and because the contact sensor recognizes contact when a change in current flow occurs. For example, when the audio output device 400 is inserted into the charging cradle, misrecognition may occur because the charging pin (or vbus) is close to the contact sensor. However, because the audio output device 400 according to various embodiments includes the first and second contact sensors 424 and 426 disposed to be spaced apart from each other, even if one contact sensor detects contact during charging, the other contact sensor determines as non-contact. Therefore, it is possible to prevent misrecognition.

According to various embodiments of the disclosure, the acceleration sensor 428 may detect the acceleration of the audio output device 400 and/or the intensity of impact. The acceleration sensor 428 may be an inertia sensor or a gyroscope. The acceleration sensor 428 may not be exposed to the outside of the audio output device 400.

According to various embodiments of the disclosure, the processor 410 may perform a function of controlling each component of the audio output device 400. To this end, the processor 410 may be electrically, functionally, and/or operatively connected to each component of the audio output device 400, such as the short-range communication module 430, the audio output unit 450, the memory 440, and each sensor of the sensor module 420. According to various embodiments of the disclosure, the processor 410 may include at least one of a main processor, a sensor hub, a bio processor, and a neural processor, each of which may perform, at least in part, operations of the processor 410 described in various embodiments of the disclosure.

According to various embodiments of the disclosure, the processor 410 may process, individually or in combination, signals corresponding to detection of respective contacts (or touches) received from the first contact sensor 424, the second contact sensor 426, and/or the touch sensor 429. For example, this signal processing operation of the processor 410 may include an operation of analyzing signals. In addition, this signal processing operation of the processor 410 may include an operation of determining whether a contact has been detected and/or determining how much area has been in contact.

According to various embodiments of the disclosure, the operation of processing signals individually by the processor 410 may include an operation of determining whether a body has contacted the interface of each sensor and/or determining a contact area, based on each signal received from the first contact sensor 424, the second contact sensor 426, and/or the touch sensor 429.

According to various embodiments of the disclosure, the operation of processing signals in combination by the processor 410 may include an operation of determining which sensor of the first contact sensor 424, the second contact sensor 426, or the touch sensor 429 has detected a contact.

Although functions performed by the processor 410 are not limited, various embodiments described in the disclosure will focus various operations of the processor 410 for detecting wearing of the audio output device 400.

According to various embodiments of the disclosure, the processor 410 may determine, based on sensing results of the first contact sensor 424, the second contact sensor 426, and the proximity sensor 422, whether the audio output device 400 is worn on the user's ear. For example, when the audio output device 400 is in a non-worn state, if the first and second contact sensors 424 and 426 detect a contact with a body, and if the proximity sensor 422 detects the proximity of an object, the processor 410 may determine that the audio output device 400 is changed to a worn state. Contrary to this, if the proximity sensor 422 detects that the object is outside a predetermined distance, the processor 410 may determine that the audio output device 400 is changed again from the worn state to the non-worn state.

According to various embodiments of the disclosure, based on a sensing value received from each sensor, the processor 410 may determine the state of the audio output device 400 as one of a charged state, an idle state, a non-worn state, and a worn state. Various embodiments regarding a control operation of the processor 410 and a method of detecting wearing in each state will be described with reference to FIG. 5.

According to various embodiments of the disclosure, when the audio output device 400 is detected as being in the worn state, the processor 410 may perform at least some of operations, such as establishing a short-range wireless connection with the electronic device and outputting audio data through the audio output unit 450. If the audio output device 400 is determined as being in the non-worn state while outputting audio data, the processor 410 may stop outputting the audio data.

According to various embodiments of the disclosure, the audio output device 400 may include a battery (not shown). The battery may supply power for operation to the respective components (e.g., the processor 410, the sensor module 420, the short-range communication module 430, the memory 440, and the audio output unit 450) of the audio output device 400.

Figure 5:
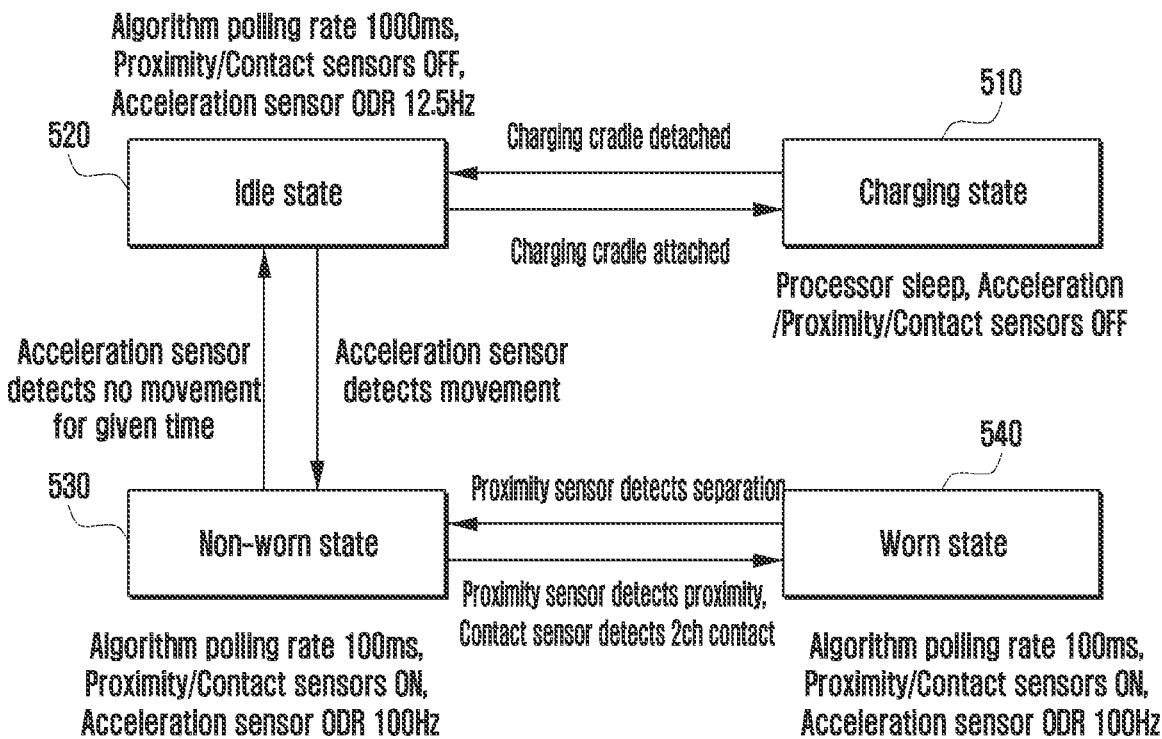
FIG. 5 is a diagram illustrating various states defined when an audio output device is detected as being worn, and operations in each state according to an embodiment of the disclosure.

FIG. 5 is a diagram illustrating various states defined when an audio output device is detected as being worn, and operations in each state, according to an embodiment of the disclosure.

Referring to FIG. 5, a charging state 510 may be a state in which an audio output device (e.g., the audio output device 400 in FIG. 4) is mounted on a charging cradle to charge power of a battery. According to various embodiments of the disclosure, when a charging pin of the audio output device contacts a pin of the charging cradle and thereby an electrical path is formed, the audio output device may operate in the charging state 510. In the charging state 510, a touch sensor (e.g., the touch sensor 429 in FIG. 4), an acceleration sensor (e.g., the acceleration sensor 428 in FIG. 4), a proximity sensor (e.g., the proximity sensor 422 in FIG. 4), a first contact sensor (e.g., the first contact sensor 424 in FIG. 4), and a second contact sensor (e.g., the second contact sensor 426 in FIG. 4) of the audio output device may be in an inactive state (or an off-state). In addition, in the charging state 510, a processor (e.g., the processor 410 in FIG. 4) of the audio output device may operate in a sleep mode in which only some functions can be executed.

According to various embodiments of the disclosure, when the user opens a lid of the charging cradle to take out the audio output device, the audio output device may execute a short-range communication module (e.g., the short-range communication module 430 in FIG. 4) to establish a short-range wireless communication connection with an external electronic device (e.g., the electronic device 280 in FIG. 2). Each of the lid and body of the charging cradle may have a magnet, and these magnets may be attached to or detached from each other when the lid is closed or opened. Thus, when the lid of the charging cradle is opened, the audio output device may detect the opening of the lid by recognizing a magnetic signal of the magnet through the charging pin.

According to various embodiments of the disclosure, when the audio output device is separated from the charging cradle, the audio output device may operate in an idle state 520. For example, when the charging pin of the audio output device is separated from the pin of the charging cradle, the audio output device may be determined as being separated from the charging cradle.

According to various embodiments of the disclosure, when the audio output device enters the idle state 520, the processor may perform a wearing detection mode. For example, the processor may activate the acceleration sensor to detect a moving speed of the audio output device.

According to various embodiments of the disclosure, the processor may perform the wearing detection mode at a polling rate determined for each state. The idle state 520 may be a state in which the user does not move the audio output device for wearing and thus a large movement does not occur in the audio output device. In the idle state 520, the processor may set the polling rate of the wearing detection mode to a low value (e.g., 1000 ms or 10 Hz). Additionally or alternatively, in the idle state 520, the processor may set an output data rate (ODR) of the acceleration sensor to a low value (e.g., 12.5 Hz). According to various embodiments of the disclosure, the processor may set the polling rate of the wearing detection mode and the output data rate of the acceleration sensor to be low in the idle state 520, thereby reducing the power consumption of the electronic device (or battery).

According to various embodiments of the disclosure, a non-worn state 530 may be a state in which the user is moving the audio output device to wear it on the ear, but it is not yet worn on the ear. For example, when a certain movement or more (e.g., a given threshold value) of the audio output device is detected from the sensing value of the acceleration sensor in the idle state 520, the processor may switch to the non-worn state 530.

According to various embodiments of the disclosure, when entering the non-worn state 530, the processor may activate the proximity sensor, the first contact sensor, and the second contact sensor, which have been deactivated in the idle state 520. In addition, the processor may set the polling rate of the wearing detection mode to a high value (e.g., 100 ms or 100 Hz) and set the output data rate of the acceleration sensor to a high value (e.g., 100 Hz). According to various embodiments of the disclosure, the processor may set the polling rate of the wearing detection mode and the output data rate of the acceleration sensor to be high in the non-worn state 530, thereby enabling fast and accurate detection of a worn state 540.

According to various embodiments of the disclosure, in the non-worn state 530, the processor may determine whether to switch to the worn state 540, based on sensing values of the proximity sensor, the first contact sensor, and the second contact sensor. For example, when the proximity sensor detects the proximity of an external object within a predetermined distance (e.g., less than a given threshold), and when the first and second contact sensors detect contacts with a body, the processor may determine a state as the worn state 540. The first and second contact sensors may respectively output electrical signals corresponding to such contacts to the touch IC through two channels (2ch) as different touch interfaces.

According to various embodiments of the disclosure, when one of the proximity sensor, the first contact sensor, and the second contact sensor detects proximity or contact, and then detection results of the other two sensors are received within a predetermined time (e.g., about 10 seconds), the processor may determine a state as the worn state 540.

According to various embodiments of the disclosure, in order to detect whether the audio output device is detached (or not worn) in the worn state 540, the processor may maintain the polling rate of the wearing detection algorithm as in the non-worn state 530 and maintain the proximity sensor, the first contact sensor, and the second contact sensor to be activated states.

According to various embodiments of the disclosure, when determining as the worn state 540, the processor may detect a user's touch input through the activated touch sensor and start audio output through the audio output unit. In addition, the processor may transmit a signal corresponding to the worn state 540 to an electronic device (e.g., the electronic device 280 in FIG. 2). Upon receiving the signal, the electronic device may perform an operation corresponding to the received signal. For example, the electronic device may activate a communication channel for transmitting audio data to the audio output device. Alternatively, the electronic device may execute a music application for automatic playback, activate a microphone for voice recognition of a voice assistant application, or activate a touch screen.

According to various embodiments of the disclosure, the electronic device may receive a signal corresponding to the worn state 540 from each of one or more predetermined audio output devices. For example, the electronic device may receive such a signal from each of a first audio output device worn on the left ear and a second audio output device worn on the right ear. The electronic device may perform a specific operation, based on a signal received from each audio output device. For example, the electronic device may perform a specific operation (e.g., music playback) only when a signal corresponding to the worn state 540 is received from both audio output devices.

As described above, the audio output device according to various embodiments may detect whether the audio output device is worn, by using the proximity sensor and the two contact sensors. This allows more accurate detection, compared to a case where only the proximity sensor is used and/or a case the proximity sensor and only one contact sensor is used. In one comparative example where only the contact sensor is used, the audio output device may not be accurately worn on the user's ear depending on the ear shape. In this example, detecting the wearing of the audio output device through the contact sensor only may often cause erroneously determining a slightly detached audio output device as being not worn, which reduces usability. However, the audio output device according to various embodiments of the disclosure is capable of reliably detecting the non-worn state by further using the proximity sensor.

In another comparative example where only the proximity sensor is used, the proximity sensor may erroneously detect wearing even when an object other than the user's ear is located near. For example, if the audio output device is left unattended in a vehicle, only a certain movement and proximity determination may cause erroneous wearing detection even being actually in the non-worn state. However, the audio output device according to various embodiments of the disclosure not only exactly detects contact with the body by using the contact sensor, but also accurately determines wearing on the ear of a wrapping type because the first and second contact sensors are disposed in different directions. According to various embodiments of the disclosure, using the proximity sensor, the processor may determine whether the worn state 540 is changed to the non-worn state 530. For example, when the amount of reflected light detected by the light receiver of the proximity sensor is less than a predetermined amount, the processor may determine that the audio output device is detached from the user's ear by a certain distance or more, and thereby determine a state as the non-worn state 530.

According to various embodiments of the disclosure, the processor uses all of the proximity sensor, the first contact sensor, and the second contact sensor when determining the worn state 540 from the non-worn state 530. In contrast, when determining the non-worn state 530 from the worn state 540, the processor may use only the proximity sensor without using the first and second contact sensors.

According to various embodiments of the disclosure, because frequent switching of state based on movement after the audio output device is worn on the user's ear may reduce the usability, the processor may immediately detect wearing but detect non-wearing through a hysteresis algorithm.

According to various embodiments of the disclosure, the processor may also determine the non-worn state 530 by further using the acceleration sensor as well as the proximity sensor.

According to various embodiments of the disclosure, when the acceleration sensor detects no movement of the audio output device for a given time in the non-worn state 530, the audio output device may switch to the idle state 520. In addition, when the charging pin is connected through insertion into the charging cradle in the non-worn state 530 or the idle state 520, the audio output device may switch to the charging state 510.

Figure 6:
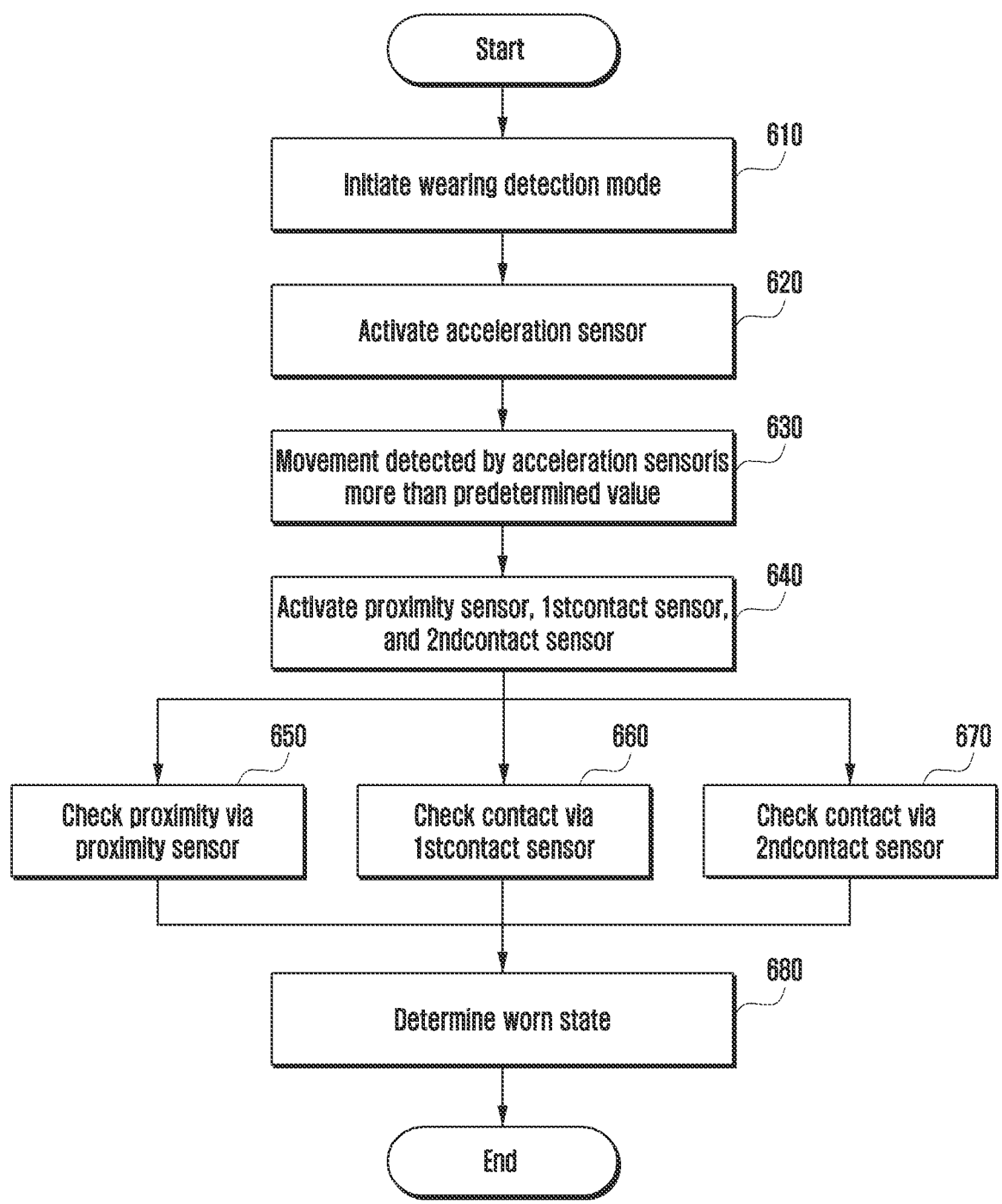
FIG. 6 is a flow diagram illustrating a method of recognizing a worn state of an audio output device according to an embodiment of the disclosure.

FIG. 6 is a flow diagram illustrating a method of recognizing a worn state of an audio output device according to an embodiment of the disclosure.

Referring to FIG. 6, operations 610 to 680 may be performed by a processor (e.g., the processor 410 in FIG. 4) of an audio output device (e.g., the audio output device 400 in FIG. 4).

According to various embodiments of the disclosure, at operation 610, the audio output device may initiate a wearing detection mode. For example, when the audio output device is separated from a charging cradle, the wearing detection mode may be initiated. According to an embodiment of the disclosure, at this time, the audio output device may change the state thereof from a charging state to an idle state.

According to various embodiments of the disclosure, at operation 620, the audio output device may activate an acceleration sensor when the wearing detection mode is initiated.

According to various embodiments of the disclosure, at operation 630, the audio output device may determine, using the acceleration sensor, whether a movement is more than a predetermined value.

According to various embodiments of the disclosure, at operation 640, the audio output device may activate a proximity sensor, a first contact sensor, and a second contact sensor when the movement is more than the predetermined value. In addition, the audio output device may set a polling rate of the wearing detection mode to a high value (e.g., 100 ms or 10 Hz) and set an output data rate of the acceleration sensor to a high value (e.g., 100 Hz). According to an embodiment of the disclosure, at this time, the audio output device may change the state thereof from the idle state to a non-worn state.

According to various embodiments of the disclosure, at operation 650, the audio output device may determine the proximity of an external object by using the proximity sensor.

According to various embodiments of the disclosure, at operation 660, the audio output device may determine the contact of a body by using the first contact sensor.

According to various embodiments of the disclosure, at operation 670, the audio output device may determine the contact of a body by using the second contact sensor.

According to various embodiments of the disclosure, at operation 680, the audio output device may determine the state thereof as a worn state, based on results of the operations 650, 660, and 670. According to various embodiments of the disclosure, the operations 650, 660, and 670 may be performed sequentially, and the order thereof is not limited. In addition, the times during which the respective operations are performed may be overlapped at least in part.

According to various embodiments of the disclosure, after one of the operations 650, 660, and 670 is completed, if the others are completed within a given time (e.g., about 10 seconds), the audio output device may determine that it is worn on the user's ear.

According to various embodiments of the disclosure, in order for the audio output device to accurately recognize wearing, both the proximity sensor and the two-channel contact sensor may need to perform detection. For example, the contact sensor may compensate for the limitations of the proximity sensor. The proximity sensor always detects proximity when a surface is physically obscured regardless of the type of an approaching object, whereas the contact sensor operates by detecting changes in current flow through electrostatic manner when an object touches a surface. Therefore, a situation in which both the proximity sensor and the two contact sensors succeed in detection may be regarded as a state where the user actually wears the audio output device.

Figure 7:
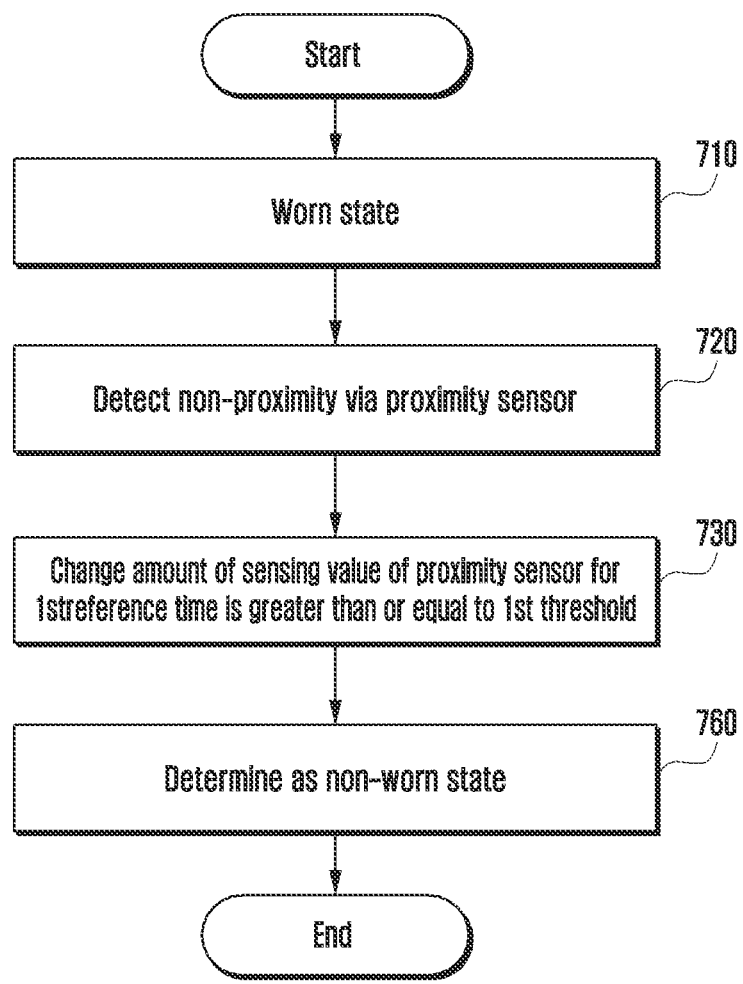
FIG. 7 is a flow diagram illustrating a method of recognizing a non-worn state of an audio output device according to an embodiment of the disclosure.

FIG. 7 is a flow diagram illustrating a method of recognizing a non-worn state of an audio output device according to an embodiment of the disclosure.

Referring to FIG. 7, operations 710 to 760 may be performed by a processor (e.g., the processor 410 in FIG. 4) of an audio output device (e.g., the audio output device 400 in FIG. 4).

According to various embodiments of the disclosure, at operation 710, the audio output device may determine the state thereof as a worn state. Various embodiments regarding a method of detecting the worn state are as described above with reference to FIG. 6.

According to various embodiments of the disclosure, at operation 720, the audio output device may detect non-proximity through the proximity sensor. When the audio output device is separated from the user's ear by a predetermined distance, the proximity sensor may detect the non-proximity through a decrease in the amount of reflected light.

According to various embodiments of the disclosure, at operation 730, the audio output device may determine whether the change amount of the sensing value of the proximity sensor for a first reference time (e.g., about 1 second) is greater than or equal to a first threshold.

According to various embodiments of the disclosure, when the change amount of the sensing value of the proximity sensor is greater than or equal to the first threshold at the operation 730, the audio output device may determine a state thereof as a non-worn state at operation 760.

According to various embodiments of the disclosure, in detecting the non-worn state, the audio output device may detect a movement thereof by further using the acceleration sensor in addition to the proximity sensor. For example, using the acceleration sensor, the audio output device may detect whether the change amount of the movement for a second reference time (e.g., about 10 minutes) is less than a second threshold. If the change amount of the sensing value of the proximity sensor for the first reference time is greater than or equal to the first threshold, and if the change amount of the movement of the audio output device for the second reference time is less than the second threshold, the audio output device may determine a state thereof as the non-worn state. For example, the audio output device may sometimes misrecognize the non-worn state as the worn state due to an error in each sensor (i.e., the proximity sensor, the first contact sensor, or the second contact sensor) or the processor, so if the acceleration sensor detects no movement, the audio output device may correct the misrecognition based on sensor errors.

According to various embodiments of the disclosure, the audio output device may use both the contact sensor (e.g., the first contact sensor and the second contact sensor) and the proximity sensor when recognizing wearing, and use only the proximity sensor when recognizing non-wearing.

For example, the proximity sensor may recognize direct contact with a position thereof as well as any proximity within a certain distance, but may detect even the proximity of any object other than a body. On the other hand, the contact sensor (e.g., the first contact sensor and the second contact sensor) only detect any contact with a body, so that any contact with an object other than the body, such as case in which the audio output device is placed on the floor, may not be detected as a contact.

According to various embodiments of the disclosure, considering the characteristics of the proximity sensor and the contact sensor, the audio output device may determine the worn state by using the contact sensor (e.g., the first contact sensor and the second contact sensor) detecting contact with a body together with the proximity sensor.

In a comparative example, the contact sensor has a short recognition range as it can detect contact only when a part of the body is actually in contact, so that contact and non-contact recognition frequently occurs in the contact sensor due to minute movement of the user wearing the audio output device. In addition, while the audio output device is being removed from the ear, the user's hand may be in contact with the contact sensor, and the contact sensor may continuously recognize it as a contact state.

Based on this, the audio output device according to various embodiments may use only the proximity sensor without using the contact sensor (e.g., the first contact sensor and the second contact sensor) when recognizing the non-worn state in the worn state.

Figure 8:
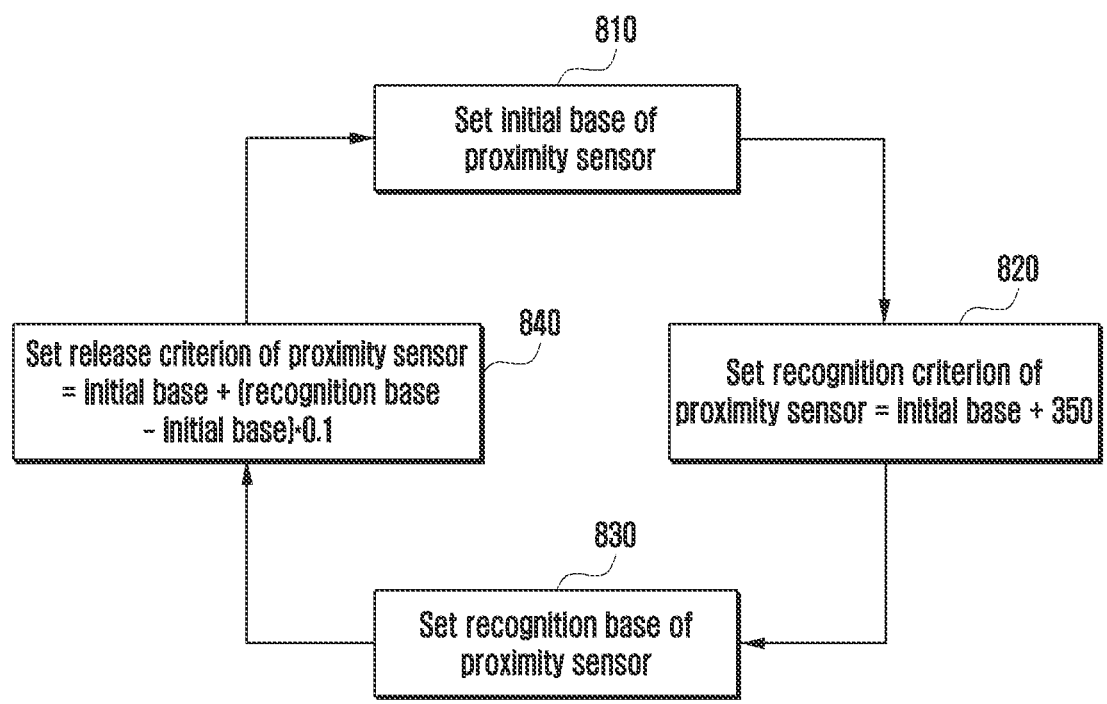
FIG. 8 is a diagram illustrating a method of determining proximity through a proximity sensor according to an embodiment of the disclosure.

FIG. 8 is a diagram illustrating a method of determining proximity through a proximity sensor according to an embodiment of the disclosure.

Referring to FIG. 8, the proximity sensor (e.g., the proximity sensor 422 in FIG. 4) may be used after initializing a chip itself or used in a manner of reading and processing data through polling. In case of the audio output device, there are various variables, such as the proximity sensor stained with a foreign matter, so the polling manner may be used in detecting proximity to handle such an exceptional situation.

According to various embodiments of the disclosure, at operation 810, the audio output device (e.g., the audio output device 400 in FIG. 4) may set an initial base of the proximity sensor. At this time, the audio output device may set a sampling rate of the proximity sensor to about 20 ms, calculate an average value of four values of pData, and thereby set the initial base. The initial base may be continuously updated using a moving average of five values of pData. In this case, if the value of pData is greater than the initial base by a specific value (e.g., 20) or more, no update may be performed. All values of pData lower than the initial base may be updated.

According to various embodiments of the disclosure, at operation 820, the audio output device may set a recognition criterion (or threshold) of the proximity sensor. For example, the proximity sensor recognition criterion may be set as a value obtained by adding a specific value (e.g., 350) to the initial base. Here, the specific value (e.g., 350) is a margin set for the proximity sensor in case the raw data value of the proximity sensor increases due to foreign matter or the like.

According to various embodiments of the disclosure, at operation 830, the audio output device may set a recognition base of the proximity sensor. When three values of proximity sensor data are continuously recognized in excess of a threshold value, the audio output device may determine that an external object is close to the proximity sensor. This may be recognition persistence for preventing a case where recognition and release are changed to each other in a situation where the sensor value is unstable for a short time.

According to various embodiments of the disclosure, after proximity recognition, the recognition base of the proximity sensor may be calculated from an average value of five values of pData followed by ignoring three pieces of persistence. In a state of being recognized as proximity, the recognition base may be continuously updated with a moving average of five values of pData. In this case, if pData is lower than the recognition base by a specific value (e.g., 20) or more, no update may be performed. All values of pData higher than the recognition base of the proximity sensor may be updated.

According to various embodiments of the disclosure, at operation 840, the audio output device may set a release criterion (or threshold) of the proximity sensor. The proximity sensor release criterion may be calculated by adding "(proximity sensor recognition base value minus proximity sensor initial base value)*0.1" to the initial base value as shown in Equation 1 below.

$$\text{Proximity sensor release criterion} = \text{Initial base} + (\text{Recognition base} - \text{Initial base}) * 0.1 \qquad \text{Equation 1}$$

In this case, the minimum value of the proximity sensor release criterion may be set as the sum of the initial base value and a specific value (e.g., 200). If "(proximity sensor recognition base value minus proximity sensor initial base value)*0.1" recited in Equation 1 is lower than a specific value (e.g., 150), this means a too low value. Thus, the proximity sensor release criterion may be set by adding the specific value (e.g., 150) to the proximity sensor initial base value. The maximum value of the proximity sensor release criterion may be set as the sum of the initial base value and another specific value (e.g., 400).

In an embodiment where the proximity sensor operates again with the initial proximity base value after the release of proximity, the proximity sensor release persistence may be differentially applied. For example, if a current proximity Praw is lower than the proximity sensor release criterion, the persistence may be checked up to 20 pieces. In this case, the number of pieces of persistence may be set from 10 to 20. Here, the number of pieces of persistence may be calculated using Equation 2 below.

$$-0.033 * (\text{Current proximity raw data value} - \text{Proximity sensor release criterion}) + 26.6 \qquad \text{Equation 2}$$

According to various embodiments of the disclosure, the audio output device may be booted while being worn on the user's ear. In this case, the proximity sensor may recognize proximity through the following operation.

According to various embodiments of the disclosure, the audio output device may store a value obtained by calibrating the proximity sensor in the memory. If the initial base value of the proximity sensor is greater than the stored calibration value of the proximity sensor by a certain value (e.g., 500) or more, the audio output device may set the proximity sensor recognition criterion as "proximity sensor calibration value+350" and set the proximity sensor release criterion as "proximity sensor calibration value+150", which can be automatically recognized.

Figure 9:
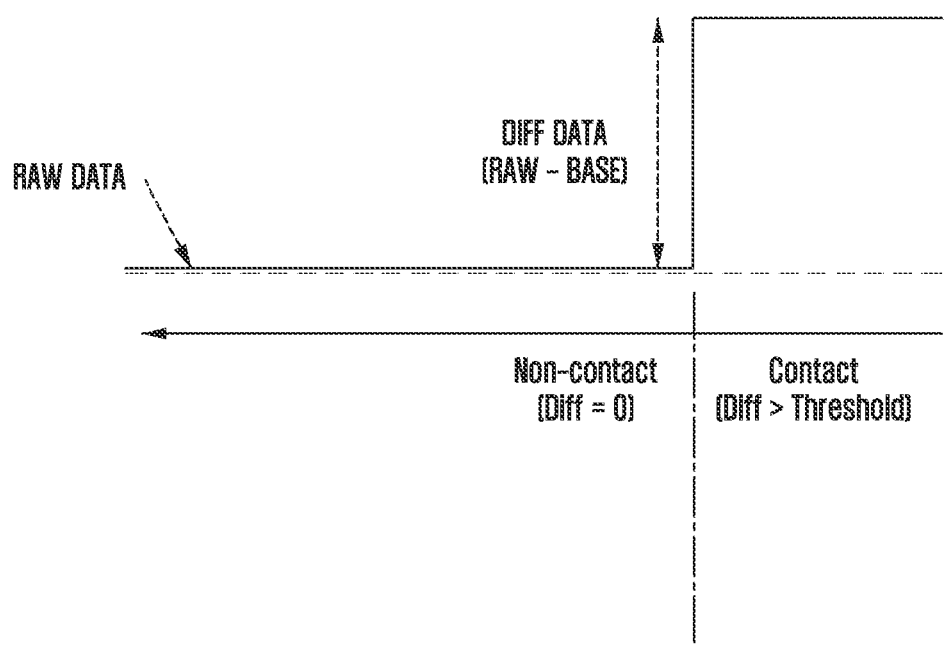
FIG. 9 is a diagram illustrating a method of determining contact through a contact sensor according to an embodiment of the disclosure.

FIG. 9 is a diagram illustrating a method of determining contact through a contact sensor according to an embodiment of the disclosure.

According to various embodiments of the disclosure, the contact sensor (e.g., the first contact sensor 424 or the second contact sensor 426 in FIG. 4) may be configured to perform recognition or non-recognition initialization in the chip itself. According to various embodiments of the disclosure, after setting the base when the contact sensor is in an open state, the audio output device may determine whether contact occurs or not, based on a difference from the base.

Referring to FIG. 9, raw data is a capacitance value of a capacitor of the contact sensor, and this varies depending on a change in external capacitance. In general, a base value of the contact sensor may be an average value of raw data over a certain period of time. Thus, raw data of the contact sensor may be set as an average of a certain number of data inputted at the time of initial booting or after being placed in an open state. A difference value (i.e., raw data−base) of the contact sensor may be an instantaneous change value of the raw data minus the base value.

Referring to FIG. 9, when a difference between the raw data and the base value is greater than a threshold, the contact sensor may determine that a part of a body is in contact.

According to various embodiments of the disclosure, an audio output device 400 may include a housing, an audio output unit 450 disposed on a first surface of the housing and outputting audio data, a first contact sensor 424 disposed on the first surface of the housing and configured to detect a contact of an external object, a second contact sensor 426 disposed to be spaced apart from the first contact sensor 424 on the first surface of the housing and configured to detect a contact of the external object, a proximity sensor 422 disposed on the first surface of the housing and configured to detect a proximity of the external object within a predetermined distance, and a processor 410 operatively connected to the audio output unit 450, the first contact sensor 424, the second contact sensor 426, and the proximity sensor 422. The processor 410 may be configured to execute a wearing detection mode of the audio output device 400, to determine the contact of the external object through the first contact sensor 424, to determine the contact of the external object through the second contact sensor 426, to determine the proximity of the external object through the proximity sensor 422, and to determine that the audio output device 400 is in a state worn by the external object, based on determining the contact and proximity of the external object.

According to various embodiments of the disclosure, the proximity sensor 422 may include a light emitter configured to output light, and a light receiver configured to detect light reflected from the external object after being outputted by the light emitter. In addition, the proximity sensor 422 may detect the proximity of the external object within a predetermined distance, based on an amount of the reflected light detected by the light receiver.

According to various embodiments of the disclosure, each of the first contact sensor 424 and the second contact sensor 426 may detect the contact of the external object when the external object is a part of a body.

According to various embodiments of the disclosure, the audio output device 400 may further include an acceleration sensor 428 configured to detect a movement of the audio output device 400.

According to various embodiments of the disclosure, the processor 410 may be further configured to execute the wearing detection mode when the audio output device 400 is separated from an external charging device.

According to various embodiments of the disclosure, when the audio output device 400 is mounted on the external charging device, the acceleration sensor 428, the first contact sensor 424, the second contact sensor 426, and the proximity sensor 422 may be in an inactive state. In addition, the processor 410 may be further configured to activate the acceleration sensor 428 when the audio output device 400 is separated from the external charging device.

According to various embodiments of the disclosure, the processor 410 may be further configured to activate the first contact sensor 424, the second contact sensor 426, and the proximity sensor 422 when a moving speed of the audio output device 400 is greater than or equal to a reference value.

According to various embodiments of the disclosure, the processor 410 may be further configured to increase a polling rate of the wearing detection mode when a moving speed of the audio output device 400 is greater than or equal to a reference value.

According to various embodiments of the disclosure, the processor 410 may be further configured to increase an output data rate of the acceleration sensor 428 when a moving speed of the audio output device 400 is greater than or equal to a reference value.

According to various embodiments of the disclosure, the processor 410 may be further configured to, after one of the contact of the external object through the first contact sensor 424, the contact of the external object through the second contact sensor 426, or the proximity of the external object through the proximity sensor 422 is detected, if others of the contact of the external object through the first contact sensor 424, the contact of the external object through the second contact sensor 426, or the proximity of the external object through the proximity sensor 422 is detected within a given time, determine that the audio output device 400 is in a state worn by the external object.

According to various embodiments of the disclosure, the processor 410 may be further configured to, after determining that the audio output device 400 is in a state worn by the external object, determine using the proximity sensor 422 whether the state is changed to a non-worn state.

According to various embodiments of the disclosure, when determining whether the state is changed to the non-worn state, detection results of the first and second contact sensors 424 and 426 may be not used.

According to various embodiments of the disclosure, a method of detecting wearing of an audio output device 400 may include executing a wearing detection mode of the audio output device 400, determining a contact of an external object through a first contact sensor 424, determining a contact of the external object through a second contact sensor 426, determining a proximity of the external object through a proximity sensor 422, and determining that the audio output device 400 is in a state worn by the external object, based on determining the contact and proximity of the external object.

According to various embodiments of the disclosure, executing a wearing detection mode of the audio output device 400 may include executing the wearing detection mode when the audio output device 400 is separated from an external charging device.

According to various embodiments of the disclosure, when the audio output device 400 is mounted on the external charging device, the acceleration sensor 428, the first contact sensor 424, the second contact sensor 426, and the proximity sensor 422 may be in an inactive state. In addition, the method may further include activating the acceleration sensor 428 when the audio output device 400 is separated from the external charging device.

According to various embodiments of the disclosure, the method may further include activating the first contact sensor 424, the second contact sensor 426, and the proximity sensor 422 when a moving speed of the audio output device 400 is greater than or equal to a reference value.

According to various embodiments of the disclosure, the method may further include increasing a polling rate of the wearing detection mode when a moving speed of the audio output device 400 is greater than or equal to a reference value.

According to various embodiments of the disclosure, the method may further include increasing an output data rate of the acceleration sensor 428 when a moving speed of the audio output device 400 is greater than or equal to a reference value.

According to various embodiments of the disclosure, determining that the audio output device 400 is in a state worn by the external object may be performed after one of the contact of the external object through the first contact sensor 424, the contact of the external object through the second contact sensor 426, or the proximity of the external object through the proximity sensor 422 is detected, if others of the contact of the external object through the first contact sensor 424, the contact of the external object through the second contact sensor 426, or the proximity of the external object through the proximity sensor 422 is detected within a given time.

According to various embodiments of the disclosure, the method may further include, after determining that the audio output device 400 is in a state worn by the external object, determining using the proximity sensor 422 whether the state is changed to a non-worn state.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An audio output device comprising:
a housing;
an audio outputter disposed on a first surface of the housing and configured to output audio data;
at least one of a first contact sensor or a second contact sensor, wherein the first contact sensor is disposed on the first surface of the housing and configured to detect contact of an external objects, and the second contact sensor is spaced apart from the first contact sensor on the first surface of the housing and configured to detect contact of the external object;
a proximity sensor disposed on the first surface of the housing and configured to detect a proximity of the external object within a predetermined distance; and
a processor operatively connected to the audio outputter, the first contact sensor, the second contact sensor, and the proximity sensor,
wherein the processor is configured to:
execute a wearing detection mode of the audio outputter,
determine at least one of a first contact of the external object through the first contact sensor and a second contact of the external object through the second contact sensor,
determine proximity of the external object through the proximity sensor, and
based on the determining of the proximity of the external object and at least one of the first contact or the second contact, determine that the audio output device is in a state worn by the external object.

2. The audio output device of claim 1,
wherein the proximity sensor comprises a light emitter and a light receiver, the light emitter being configured to output light, the light receiver being configured to detect light reflected from the external object after being outputted by the light emitter, and
wherein the proximity sensor is further configured to:
based on an amount of the light reflected being detected by the light receiver, detect the proximity of the external object within the predetermined distance.

3. The audio output device of claim 1, wherein each of the first contact sensor and the second contact sensor is further configured to, based on the external object being a part of a body, detect the first contact and the second contact of the external object.

4. The audio output device of claim 1, further comprising:
an acceleration sensor configured to detect a movement of the audio output device.

5. The audio output device of claim 4, wherein the processor is further configured to:
in response to the audio output device being separated from an external charging device, execute the wearing detection mode.

6. The audio output device of claim 5, wherein the processor is further configured to:
in response to the audio output device being mounted on the external charging device, controlling the acceleration sensor, the first contact sensor, the second contact sensor, and the proximity sensor to be in an inactive state, and
in response to the audio output device being separated from the external charging device, activate the acceleration sensor.

7. The audio output device of claim 6, wherein the processor is further configured to:
in response to a moving speed of the audio output device being greater than or equal to a reference value, activate the first contact sensor, the second contact sensor, and the proximity sensor.

8. The audio output device of claim 6, wherein the processor is further configured to:
in response to a moving speed of the audio output device being greater than or equal to a reference value, increase a polling rate of the wearing detection mode.

9. The audio output device of claim 6, wherein the processor is further configured to:
in response to a moving speed of the audio output device being greater than or equal to a reference value, increase an output data rate of the acceleration sensor.

10. The audio output device of claim 1, wherein the determining that the audio output device is in the state worn by the external object comprises, after one of the first contact of the external object through the first contact sensor, the second contact of the external object through the second contact sensor, or the proximity of the external object through the proximity sensor is detected, and others of the first contact of the external object through the first contact sensor, the second contact of the external object through the second contact sensor, or the proximity of the external object through the proximity sensor are detected within a given time, determine that the audio output device is in the state worn by the external object.

11. The audio output device of claim 1, wherein the processor is further configured to:
   after determining that the audio output device is in the state worn by the external object, determine, using the proximity sensor, whether the state is changed to a non-worn state.

12. The audio output device of claim 11, wherein the processor is further configured to:
   based on the determining whether the state is changed to the non-worn state, refrain from using detection results of the first and second contact sensors.

13. A method of detecting wearing of an audio output device, the method comprising:
   executing a wearing detection mode of the audio output device;
   determining at least one of a first contact of an external object through a first contact sensor and a second contact of the external object through a second contact sensor;
   determining a proximity of the external object through a proximity sensor; and
   based on the determining of the proximity of the external object and at least one of the first contact or the second contact, determining that the audio output device is in a state worn by the external object.

14. The method of claim 13, wherein the executing of the wearing detection mode of the audio output device comprises executing the wearing detection mode in response to the audio output device being separated from an external charging device.

15. The method of claim 14, further comprising:
   in response to the audio output device being mounted on the external charging device, controlling an acceleration sensor, the first contact sensor, the second contact sensor, and the proximity sensor to be in an inactive state, and
   in response to the audio output device being separated from the external charging device, activating the acceleration sensor.

16. The method of claim 15, further comprising:
   in response to a moving speed of the audio output device being greater than or equal to a reference value, activating the first contact sensor, the second contact sensor, and the proximity sensor.

17. The method of claim 15, further comprising:
   in response to a moving speed of the audio output device being greater than or equal to a reference value, increasing a polling rate of the wearing detection mode.

18. The method of claim 15, further comprising:
   in response to a moving speed of the audio output device being greater than or equal to a reference value, increasing an output data rate of the acceleration sensor.

19. The method of claim 13, wherein the determining that the audio output device is in the state worn by the external object comprises, after one of the first contact of the external object through the first contact sensor, the second contact of the external object through the second contact sensor, or the proximity of the external object through the proximity sensor is detected, and others of the first contact of the external object through the first contact sensor, the second contact of the external object through the second contact sensor, or the proximity of the external object through the proximity sensor are detected within a given time, determining that the audio output device is in the state worn by the external object.

20. The method of claim 13, further comprising:
   after determining that the audio output device is in the state worn by the external object, determining, using the proximity sensor, whether the state is changed to a non-worn state.

* * * * *